(12) United States Patent
Li et al.

(10) Patent No.: US 10,110,720 B2
(45) Date of Patent: Oct. 23, 2018

(54) DIALING METHOD FOR USER TERMINAL AND USER TERMINAL

(71) Applicant: Huawei Technologies Co., Ltd., Shenzhen (CN)

(72) Inventors: Jie Li, Shenzhen (CN); Huaqi Hao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/547,679

(22) PCT Filed: Jan. 20, 2016

(86) PCT No.: PCT/CN2016/071475
§ 371 (c)(1),
(2) Date: Jul. 31, 2017

(87) PCT Pub. No.: WO2016/119616
PCT Pub. Date: Aug. 4, 2016

(65) Prior Publication Data
US 2017/0366654 A1  Dec. 21, 2017

(30) Foreign Application Priority Data
Jan. 29, 2015 (CN) .......................... 2015 1 0046180

(51) Int. Cl.
*H04M 9/00* (2006.01)
*H04M 1/272* (2006.01)
(Continued)

(52) U.S. Cl.
CPC ......... *H04M 1/2725* (2013.01); *H04M 1/673* (2013.01); *H04B 1/385* (2013.01); *H04M 2201/42* (2013.01); *H04M 2250/22* (2013.01)

(58) Field of Classification Search
CPC ..... H04W 12/06; H04W 4/008; H04W 88/02; H04W 12/04; H04W 4/12; H04W 84/18;
(Continued)

(56) References Cited

U.S. PATENT DOCUMENTS

2010/0001967 A1*  1/2010  Yoo ........................ G06F 3/0488
345/173
2012/0293409 A1   11/2012  Miura et al.
(Continued)

FOREIGN PATENT DOCUMENTS

| CN | 1489389 A | 4/2004 |
|----|-----------|--------|
| CN | 1527628 A | 9/2004 |

(Continued)

OTHER PUBLICATIONS

Machine Translation and Abstract of Chinese Publication No. CN1489389, Apr. 14, 2004, 24 pages.
(Continued)

*Primary Examiner* — Tu X Nguyen
(74) *Attorney, Agent, or Firm* — Conley Rose, P.C.

(57) ABSTRACT

A dialing method for a user terminal is provided. The method includes: detecting, by a user terminal, at least one entering operation performed on a moment indication numeral on a clock dial, where the clock dial is displayed on a standby screen of the user terminal; determining, by the user terminal, a dialing numeral corresponding to the entering operation; generating, by the user terminal, a dialing number according to the dialing numeral; and performing, by the user terminal, a call by using the dialing number as a called number, a user may perform a dialing operation by using the standby screen of the user terminal, and can perform the dialing operation without a need to enter a home screen by using the standby screen and then enter a dialing screen by using the home screen.

18 Claims, 8 Drawing Sheets

(51) Int. Cl.
*H04M 1/673* (2006.01)
*H04B 1/3827* (2015.01)

(58) Field of Classification Search
CPC ..... H04W 12/02; H04W 12/08; H04W 12/10; H04W 28/26; H04W 48/00; H04W 4/00; H04W 4/023; H04W 4/027; H04W 4/028; H04W 4/04; H04W 4/043; H04W 4/06; H04W 4/08; H04W 52/0209; H04W 52/0287; H04W 52/32
USPC .................................................. 455/411, 401
See application file for complete search history.

(56) References Cited

U.S. PATENT DOCUMENTS

| | | | |
|---|---|---|---|
| 2014/0025957 A1* | 1/2014 | Chen | H04L 63/083 713/184 |
| 2014/0047525 A1 | 2/2014 | Bonhoff | |
| 2015/0155903 A1* | 6/2015 | Jang | H04B 1/3888 455/575.8 |

FOREIGN PATENT DOCUMENTS

| | | |
|---|---|---|
| CN | 202340243 U | 7/2012 |
| CN | 102714671 A | 10/2012 |
| CN | 103581437 A | 2/2014 |
| EP | 1976242 A1 | 10/2008 |
| EP | 2639733 A1 | 9/2013 |
| GB | 2343587 A | 5/2000 |
| GB | 2346763 A | 8/2000 |
| JP | 3838109 B2 | 10/2006 |
| KR | 20110013653 A | 2/2011 |

OTHER PUBLICATIONS

Machine Translation and Abstract of Chinese Publication No. CN1527628, Sep. 8, 2004, 5 pages.
Machine Translation and Abstract of Chinese Publication No. CN103581437, Feb. 12, 2014, 9 pages.
Machine Translation and Abstract of Chinese Publication No. CN202340243, Jul. 18, 2012, 5 pages.
Foreign Communication From a Counterpart Application, PCT Application No. PCT/CN2016/071475, English Translation of International Search Report dated Apr. 20, 2016, 2 pages.
Foreign Communication From a Counterpart Application, PCT Application No. PCT/CN2016/071475, English Translation of Written Opinion dated Apr. 20, 2016, 7 pages.
Machine Translation and Abstract of Korean Publication No. KR20110013653, Feb. 10, 2011, 33 pages.
Foreign Communication From a Counterpart Application, European Application No. 16742678.2, Extended European Search Report dated Feb. 13, 2018, 8 pages.

* cited by examiner

DIALING METHOD FOR USER TERMINAL AND USER TERMINAL

CROSS-REFERENCE TO RELATED APPLICATIONS

This application is a National Stage of International Application No. PCT/CN2016/071475, filed on Jan. 20, 2016, which claims priority to Chinese Patent Application No. 201510046180.1, filed on Jan. 29, 2015, both of which are hereby incorporated by reference in their entireties.

TECHNICAL FIELD

The present disclosure relates to the communications field, and in particular, to a dialing method for a user terminal, and a user terminal.

BACKGROUND

A standby screen of a user terminal may be a screen displayed when the user terminal does not perform another substantial operation within a relatively long period of time after being powered on. The substantial operation may be running an application, editing a file, or the like. Currently, a user terminal represented by a smart watch has evolved from a single accessory of a mobile phone into a device that can work independently, and many smart watches have a function of independent communication. Because of a volume feature of the smart watch, the smart watch generally has no independent keyboard and dialing cannot be performed as conveniently as dialing is performed on a feature phone using a physical keyboard. As a user terminal, the smart watch generally uses a clock dial similar to that of a traditional watch as a standby screen. As shown in FIG. 1, the clock dial is displayed on the standby screen, and moment indication numerals used to indicate moment information are displayed on the clock dial.

A smart watch is used as an example, and an existing dialing manner for a user terminal is after entering a home screen, tapping a dialing icon to enter a dialing screen and then performing a dialing operation, as shown in FIG. 2.

However, in the existing dialing manner, when dialing, a user needs to enter a home screen using a standby screen, and can perform a dialing operation only after entering a dialing screen by tapping a dialing icon on the home screen, as shown in FIG. 2. That is, the dialing operation can be performed only after entering screens of three levels. Therefore, an operation process is complex.

SUMMARY

Embodiments of the present disclosure provide a dialing method for a user terminal such that a dialing operation is performed on a standby screen of the user terminal. This method simplifies a dialing procedure of the user terminal, and resolves a problem that the user terminal needs to enter screens of multiple levels before implementing a dialing operation and an operation process is relatively complex.

In view of this, a first aspect of the present disclosure provides a dialing method for a user terminal, including detecting, by a user terminal, at least one entering operation performed on a moment indication numeral on a clock dial, where the clock dial is displayed on a standby screen of the user terminal, determining, by the user terminal, a dialing numeral corresponding to the entering operation, generating, by the user terminal, a dialing number according to the dialing numeral, and performing, by the user terminal, a call using the dialing number as a called number.

With reference to the first aspect of the present disclosure, in a first implementation manner of the first aspect of the present disclosure, the determining, by the user terminal, a dialing numeral corresponding to the entering operation includes calculating, by the user terminal each time the user terminal detects an entering operation, a time interval between the currently detected entering operation and a previous entering operation, and determining, by the user terminal when the time interval is less than a preset value, a dialing numeral corresponding to the currently detected entering operation.

With reference to the first implementation manner of the first aspect of the present disclosure, in a second implementation manner of the first aspect of the present disclosure, after the generating, by the user terminal, a dialing number according to the dialing numeral, and before the performing, by the user terminal, a call using the dialing number as a called number, the method includes determining, by the user terminal, whether the dialing number is a valid number, and if yes, displaying, by the user terminal, a dialing icon on the standby screen, and the performing, by the user terminal, a call using the dialing number as a called number is performing, by the user terminal when the user terminal detects an entering operation performed on the dialing icon, the call using the dialing number as the called number.

With reference to the second implementation manner of the first aspect of the present disclosure, in a third implementation manner of the first aspect of the present disclosure, the determining, by the user terminal, whether the dialing number is a valid number is determining, by the user terminal, whether the dialing number matches a preset number, and if yes, determining, by the user terminal, that the dialing number is a valid number, or if no, determining, by the user terminal, that the dialing number is not a valid number.

With reference to the second implementation manner of the first aspect of the present disclosure, in a fourth implementation manner of the first aspect of the present disclosure, the determining, by the user terminal, whether the dialing number is a valid number is determining, by the user terminal, whether a digit quantity of the dialing number is a valid digit quantity, and if yes, determining, by the user terminal, that the dialing number is a valid number, or if no, determining, by the user terminal, that the dialing number is not a valid number.

With reference to the first aspect of the present disclosure, the first implementation manner of the first aspect of the present disclosure, the second implementation manner of the first aspect of the present disclosure, the third implementation manner of the first aspect of the present disclosure, or the fourth implementation manner of the first aspect of the present disclosure, in a fifth implementation manner of the first aspect of the present disclosure, before the detecting, by a user terminal, at least one entering operation performed on a moment indication numeral on a clock dial, the method includes determining, by the user terminal when the user terminal detects a dialing gesture, whether the user terminal is in a password lock screen state, and if yes, performing, by the user terminal, an unlock operation, and displaying, by the user terminal on the standby screen after the unlock operation is complete, a feature used to prompt dialing, or if no, displaying, by the user terminal on the standby screen, a feature used to prompt dialing.

With reference to the fifth implementation manner of the first aspect of the present disclosure, in a sixth implementation manner of the first aspect of the present disclosure, the performing, by the user terminal, an unlock operation is displaying, by the user terminal on the standby screen, a feature used to prompt unlock, detecting, by the user terminal, at least one unlock operation performed on the moment indication numeral on the clock dial, determining, by the user terminal, an unlock numeral corresponding to the unlock operation, generating, by the user terminal, an unlock number according to the unlock numeral, and performing, by the user terminal, unlock according to the unlock number.

With reference to the first aspect of the present disclosure, the first implementation manner of the first aspect of the present disclosure, the second implementation manner of the first aspect of the present disclosure, the third implementation manner of the first aspect of the present disclosure, the fourth implementation manner of the first aspect of the present disclosure, the fifth implementation manner of the first aspect of the present disclosure, or the sixth implementation manner of the first aspect of the present disclosure, in a seventh implementation manner of the first aspect of the present disclosure, the method further includes displaying, by the user terminal, the dialing number in a preset area of the standby screen.

A second aspect of the present disclosure provides a user terminal, including a display screen configured to display a standby screen, where a clock dial is displayed on the standby screen, a touchscreen configured to detect at least one entering operation performed on a moment indication numeral on the clock dial displayed on the display screen, a processor configured to determine a dialing numeral corresponding to the entering operation detected by the touchscreen, and generate a dialing number according to the dialing numeral, and a communications module configured to perform a call using the dialing number as a called number.

With reference to the second aspect of the present disclosure, in a first implementation manner of the second aspect of the present disclosure, the processor is further configured to calculate, each time the touchscreen detects an entering operation, a time interval between the currently detected entering operation and a previous entering operation, and determine whether the time interval is less than a preset value, and if yes, determine a dialing numeral corresponding to the entering operation currently detected by the touchscreen.

With reference to the second aspect of the present disclosure or the first implementation manner of the second aspect of the present disclosure, in a second implementation manner of the second aspect of the present disclosure, after the processor generates the dialing number according to the dialing numeral, and before the communications module performs the call using the dialing number as the called number, the processor is further configured to determine whether the dialing number is a valid number, the display screen is further configured to display a dialing icon when the processor determines that the dialing number is a valid number, and the communications module is further configured to perform, when the touchscreen detects an entering operation performed on the dialing icon, the call using the dialing number as the called number.

With reference to the second aspect of the present disclosure, the first implementation manner of the second aspect of the present disclosure, or the second implementation manner of the second aspect of the present disclosure, in a third implementation manner of the second aspect of the present disclosure, the touchscreen is further configured to detect a dialing gesture, the processor is further configured to determine, when the touchscreen detects the dialing gesture, whether the user terminal is in a password lock screen state, and if yes, perform an unlock operation, and the display screen is further configured to display, on the standby screen after the unlock operation is complete, a feature used to prompt dialing, or if no, display, on the standby screen, a feature used to prompt dialing.

With reference to the second aspect of the present disclosure, the first implementation manner of the second aspect of the present disclosure, the second implementation manner of the second aspect of the present disclosure, or the third implementation manner of the second aspect of the present disclosure, in a fourth implementation manner of the second aspect of the present disclosure, the display screen is further configured to display, on the standby screen when the user terminal performs the unlock operation, a feature used to prompt unlock, the touchscreen is further configured to detect, on the standby screen after the display screen displays the feature used to prompt unlock, at least one unlock operation performed on the moment indication numeral on the clock dial, and the processor is further configured to determine, when the touchscreen detects the at least one unlock operation performed on the moment indication numeral on the clock dial, an unlock numeral corresponding to the unlock operation, and generate an unlock number according to the unlock numeral, and perform unlock according to the unlock number.

With reference to the second aspect of the present disclosure, the first implementation manner of the second aspect of the present disclosure, the second implementation manner of the second aspect of the present disclosure, the third implementation manner of the second aspect of the present disclosure, or the fourth implementation manner of the second aspect of the present disclosure, in a fifth implementation manner of the second aspect of the present disclosure, the display screen is further configured to display the dialing number in a preset area of the standby screen.

It can be learned from the foregoing technical solutions that the embodiments of the present disclosure have the following advantages. A clock dial is displayed on a standby screen of a user terminal, and a moment indication numeral is displayed on the clock dial. When performing dialing using the user terminal, a user may enter a dialing numeral by means of an entering operation performed on the moment indication numeral. The user terminal generates a dialing number according to the dialing numeral, and performs a call using the dialing number as a called number, that is, the user may conveniently implement a dialing operation on the standby screen of the user terminal, and can implement the dialing operation without a need to use screens of multiple levels. Therefore, a procedure in which the user performs the dialing operation using the user terminal is simplified, and efficiency of performing, by the user, the dialing operation using the user terminal is improved.

DESCRIPTION OF EMBODIMENTS

Embodiments of the present disclosure provide a dialing method for a user terminal such that the user terminal performs a dialing operation on a standby screen of the user terminal, thereby simplifying a dialing procedure of the user terminal, and resolving a problem that the user terminal needs to enter interfaces of multiple levels before implementing a dialing operation and an operation process is relatively complex.

To make persons skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do no need to be used to describe a specific order or sequence. It should be understood that the terms used in such a way are interchangeable in proper circumstances such that the embodiments of the present disclosure described herein can be implemented in other orders than the order illustrated or described herein. Moreover, the terms "include", "have", and any other variants thereof are intended to cover non-exclusive inclusion, for example, a process, a method, a system, a product, or a device that includes a series of steps or units is not necessarily limited to those steps or units that are clearly listed, but may include other steps or units that are not clearly listed or are inherent to the process, the method, the system, the product, or the device.

Figure 3:
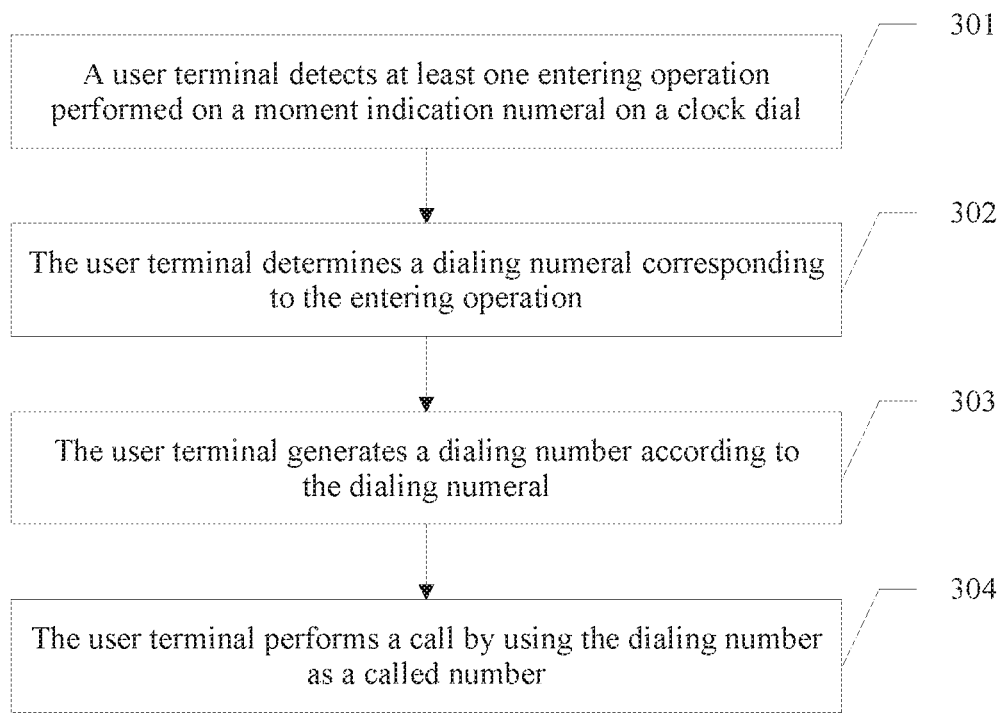
FIG. 3 is a flowchart of a dialing method for a user terminal according to an embodiment of the present disclosure.

Referring to FIG. 3, a dialing method for a user terminal according to an embodiment of the present disclosure includes the following steps.

301. A user terminal detects at least one entering operation performed on a moment indication numeral on a clock dial.

In this embodiment, the user terminal can detect the at least one entering operation performed on the moment indication numeral on the clock dial, and the clock dial is displayed on a standby screen of the user terminal.

Figure 1:
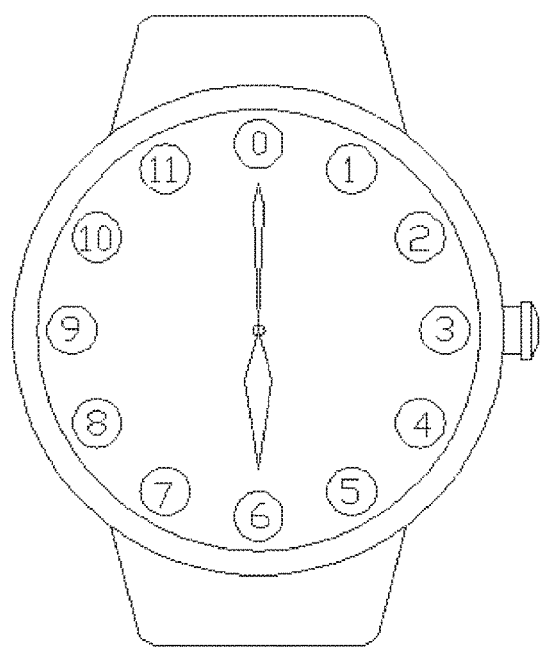
FIG. 1 is a standby screen of a user terminal.

It may be understood that the standby screen of the user terminal may be set according to user selection. However, in this embodiment and subsequent embodiments, the clock dial is displayed on the standby screen of the user terminal, and the moment indication numeral used to indicate moment information is displayed on the clock dial, that is, numerals "0" to "11" shown on a standby screen of a user terminal in FIG. 1.

In this embodiment and the subsequent embodiments, the entering operation performed on the moment indication numeral on the standby screen is completed by a user, and may be that the user taps or slides the moment indication numeral, or may be another entering operation, which is not limited herein.

In practical application, the user terminal may be a smart watch or a mobile phone, or may be another device, which is not limited herein. For ease of description, in descriptions in this embodiment and the subsequent embodiments, a smart watch is used as an example of the user terminal.

302. The user terminal determines a dialing numeral corresponding to the entering operation.

In this embodiment, after the user terminal detects the at least one entering operation performed on the moment indication numeral on the standby screen, the user terminal can determine the dialing numeral corresponding to the entering operation.

303. The user terminal generates a dialing number according to the dialing numeral.

After determining the dialing numeral corresponding to the entering operation, the user terminal can generate the dialing number according to the dialing numeral.

It should be noted that the dialing number is a numeral string including at least one dialing numeral, and that the user terminal generates a dialing number according to the dialing numeral may be saving, by the user terminal, the dialing numeral and using a numeral string formed after the saving as the dialing number. In practical application, to improve user experience, the user is allowed to delete a dialing numeral corresponding to a previous entering operation, and when the user terminal determines that the dialing numeral is a preset numeral, for example, when the preset numeral is "10" or "11" and the user enters "10" or "11", the user terminal may delete the dialing numeral corresponding to the previous entering operation and use a numeral string formed by remaining dialing numerals as the dialing number. It may be understood that the user terminal may further generate the dialing number according to the dialing numeral in another manner. For example, if one-touch easy dialing is set for the dialing numeral, a one-touch easy dialing number corresponding to the dialing numeral is used as the dialing number, which is not limited herein.

304. The user terminal performs a call using the dialing number as a called number.

After generating the dialing number according to the dialing numeral, the user terminal can perform the call using the dialing number as the called number.

Figure 2:
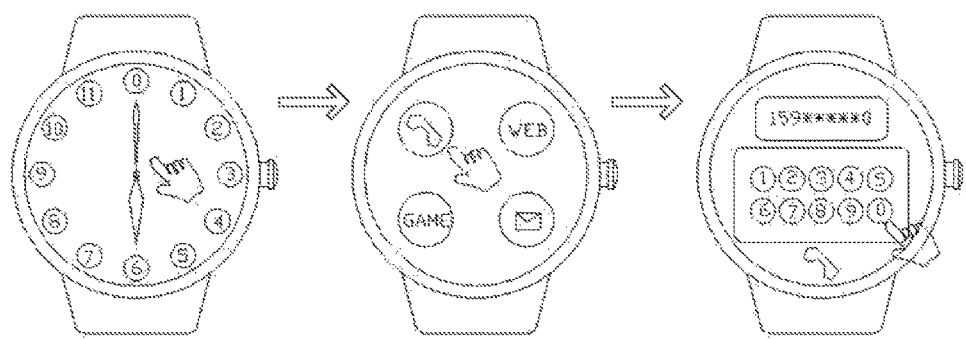
FIG. 2 is a schematic diagram of a dialing procedure of a user terminal in the prior art.

In this embodiment, a clock dial is displayed on a standby screen of a user terminal, and a moment indication numeral is displayed on the clock dial. When performing dialing using the user terminal, a user may enter a dialing numeral by means of an entering operation performed on the moment indication numeral. As shown in FIG. 2, the user terminal generates a dialing number according to the dialing numeral, and performs a call using the dialing number as a called number, that is, the user may conveniently implement a dialing operation on the standby screen of the user terminal, and can implement the dialing operation without a need to use screens of multiple levels. Therefore, a procedure in which the user performs the dialing operation using the user terminal is simplified, and efficiency of performing, by the user, the dialing operation using the user terminal is improved.

In practical application, the user terminal may implement the dialing operation using the standby screen in multiple manners, which are described in detail in the following.

Figure 4:
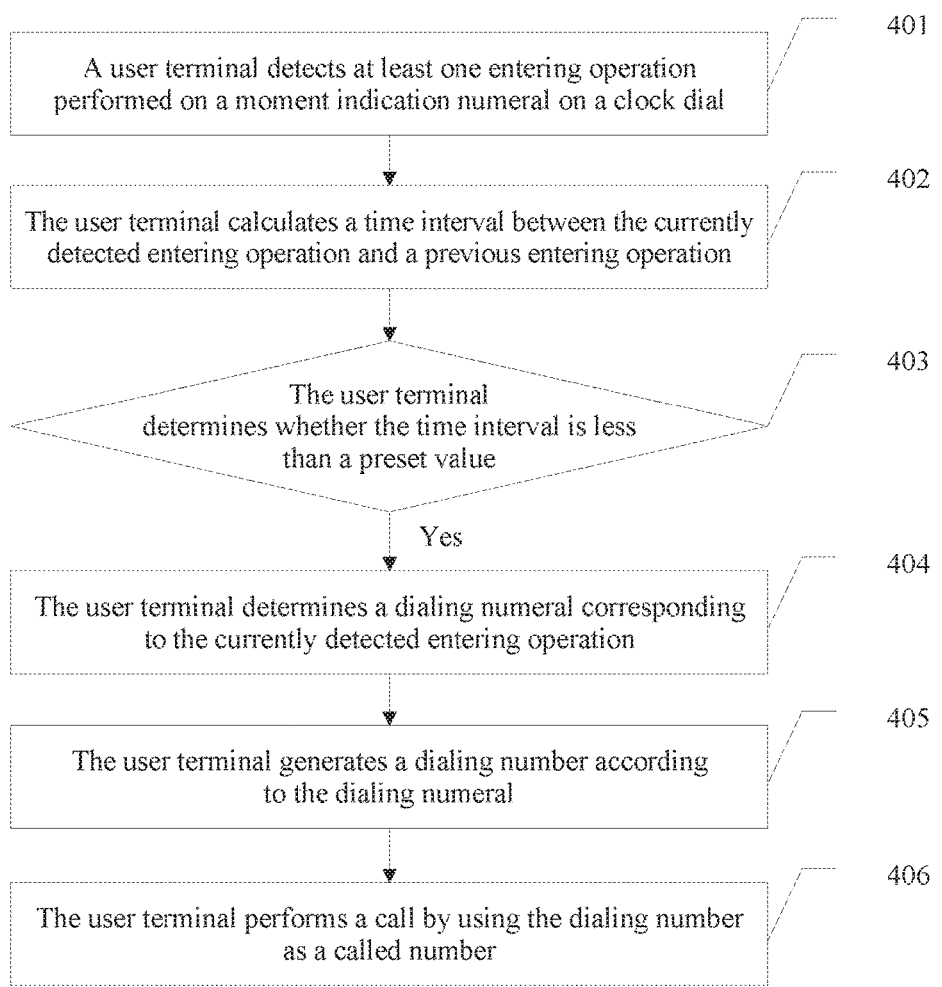
FIG. 4 is a flowchart of a dialing method for a user terminal according to another embodiment of the present disclosure.

Referring to FIG. 4, a dialing method for a user terminal according to another embodiment of the present disclosure includes the following steps.

401. A user terminal detects at least one entering operation performed on a moment indication numeral on a clock dial.

In this embodiment, the user terminal can detect the entering operation performed on the moment indication numeral on the clock dial, and the clock dial is displayed on a standby screen of the user terminal.

In practical application, the moment indication numeral on the clock dial displayed on the standby screen of the user terminal generally includes numeral elements "0" to "11". In this embodiment of the present disclosure, the moment indication numeral on the clock dial displayed on the standby screen is not limited.

402. The user terminal calculates a time interval between the currently detected entering operation and a previous entering operation.

In this embodiment, each time the user terminal detects an entering operation, the user terminal calculates a time interval between the currently detected entering operation and a previous entering operation.

It should be noted that, each time the user terminal detects an entering operation, the user terminal may save current time information, obtain time information of a previous entering operation, and perform calculation according to the current time information and the time information of the previous entering operation, to obtain a time interval between the currently detected entering operation and the previous entering operation. In practical application, the user terminal may also calculate the time interval between the currently detected entering operation and the previous entering operation using another method, which is not limited herein.

403. The user terminal determines whether the time interval is less than a preset value, and if yes, performs step 404.

In this embodiment, after the user terminal calculates the time interval between the currently entering operation and the previous entering operation, the user terminal determines whether the time interval is less than the preset value, and if yes, performs step 404.

The preset value in this embodiment may be determined according to a factor such as an actual situation or a user operation habit. For example, the preset value may be 0.2 seconds, 0.5 seconds, or 1 second, which is not limited herein.

404. The user terminal determines a dialing numeral corresponding to the currently detected entering operation.

In this embodiment, when the user terminal determines that the time interval is less than the preset value, it indicates that a user expects to perform dialing on the standby screen, and the user terminal determines the dialing numeral corresponding to the currently detected entering operation.

405. The user terminal generates a dialing number according to the dialing numeral.

After determining the dialing numeral corresponding to the currently detected entering operation, the user terminal can generate the dialing number according to the dialing numeral.

It should be noted that the dialing number is a numeral string including at least one dialing numeral, and that the user terminal generates a dialing number according to the dialing numeral may be specifically saving, by the user terminal, the dialing numeral and using a numeral string formed after the saving as the dialing number. In practical application, to improve user experience, the user is allowed to delete a dialing numeral corresponding to the previous entering operation, and when the user terminal determines that the dialing numeral is a preset numeral, for example, when the preset numeral is "10" or "11" and the user enters "10" or "11", the user terminal may delete the dialing numeral corresponding to the previous entering operation and use a numeral string formed by remaining dialing numerals as the dialing number. It may be understood that the user terminal may further generate the dialing number according to the dialing numeral in another manner. For example, if one-touch easy dialing is set for the dialing numeral, a one-touch easy dialing number corresponding to the dialing numeral is used as the dialing number, which is not limited herein.

406. The user terminal performs a call using the dialing number as a called number.

After generating the dialing number according to the dialing numeral, the user terminal can perform the call using the dialing number as the called number.

It should be noted that, in this embodiment, the user terminal may display the dialing number in a preset area of the standby screen, or in practical application, the user terminal may not display the dialing number, which is not limited herein.

In this embodiment, a clock dial is displayed on a standby screen of a user terminal, and a moment indication numeral is displayed on the clock dial. When performing dialing using the user terminal, a user may enter a dialing numeral by means of an entering operation performed on the moment indication numeral. As shown in FIG. 2, the user terminal generates a dialing number according to the dialing numeral, and performs a call using the dialing number as a called number, that is, the user may conveniently implement a dialing operation on the standby screen of the user terminal, and can implement the dialing operation without a need to use screens of multiple levels. Therefore, a procedure in which the user performs the dialing operation using the user terminal is simplified, and efficiency of performing, by the user, the dialing operation using the user terminal is improved.

Secondly, this embodiment provides a manner of implementing a dialing operation using a standby screen. That is, each time the user terminal detects an entering operation, a time interval between the currently detected entering operation and a previous entering operation is calculated. When the time interval is less than a preset value, it indicates that a user expects to perform dialing on the standby screen, and the user terminal determines a dialing numeral corresponding to the currently detected entering operation. Otherwise, it may be considered that a user performs a misoperation, thereby avoiding a misoperation of the user in practical application and improving user experience.

Figure 5:
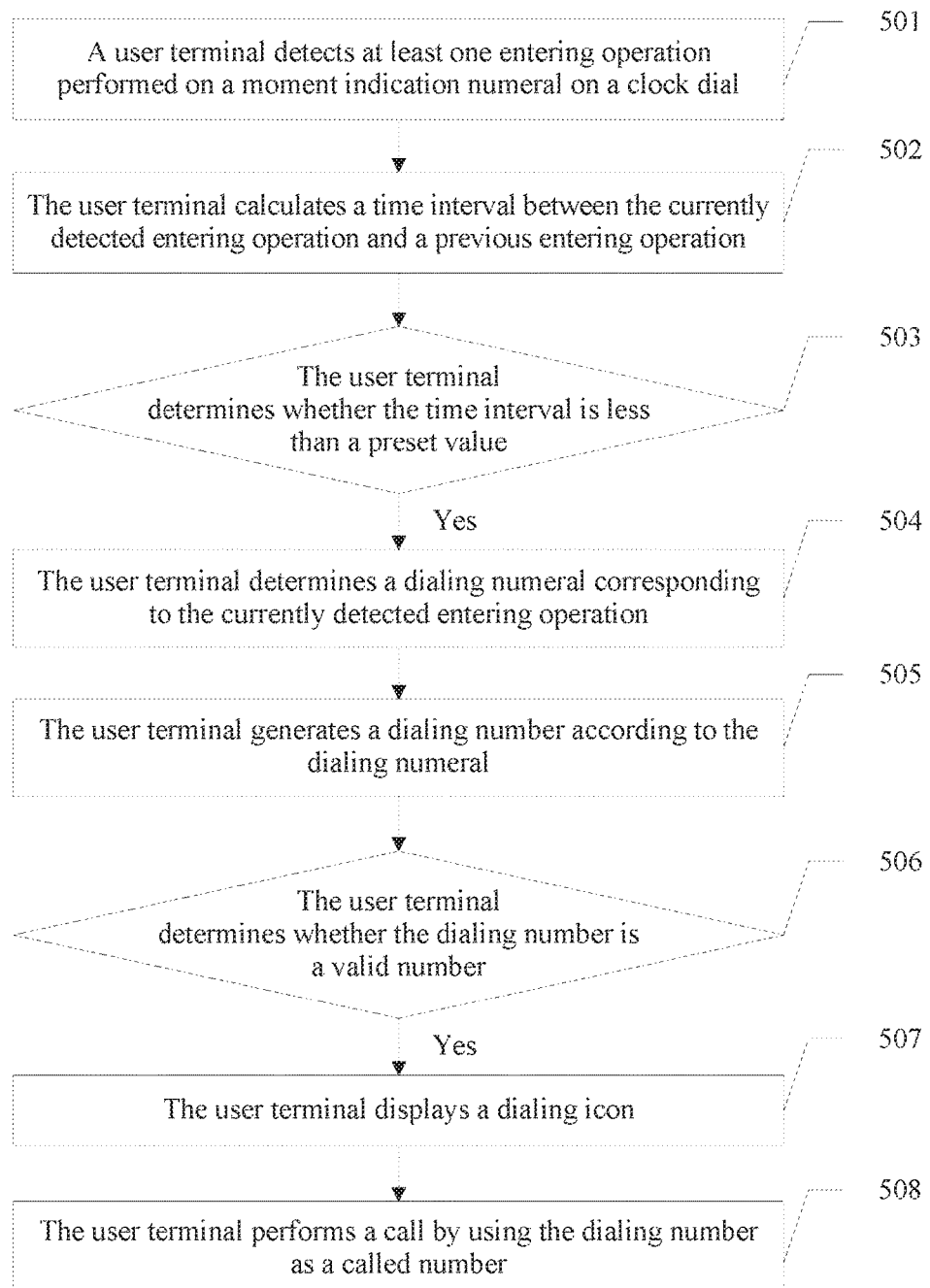
FIG. 5 is a flowchart of a dialing method for a user terminal according to another embodiment of the present disclosure.

In practical application, to better avoid a misoperation or to directly display effect exerted by a dialing icon on another display element displayed on the standby screen, the dialing icon may be displayed only after it is determined that the dialing number is a valid number, a call is performed using the dialing number as a called number after an entering operation performed on the dialing icon is detected. Specifically Referring to FIG. 5, a dialing method for a user terminal according to another embodiment of the present disclosure includes the following steps.

501. A user terminal detects at least one entering operation performed on a moment indication numeral on a clock dial.

In this embodiment, the user terminal can detect the entering operation performed on the moment indication numeral on the clock dial, and the clock dial is displayed on a standby screen of the user terminal.

In practical application, the moment indication numeral on the clock dial displayed on the standby screen of the user terminal generally includes numeral elements "0" to "11". In this embodiment of the present disclosure, the moment indication numeral on the clock dial displayed on the standby screen is not limited.

502. The user terminal calculates a time interval between the currently detected entering operation and a previous entering operation.

In this embodiment, each time the user terminal detects an entering operation, the user terminal calculates a time interval between the currently detected entering operation and a previous entering operation.

It should be noted that, each time the user terminal detects an entering operation, the user terminal may save current time information, obtain time information of a previous entering operation, and perform calculation according to the current time information and the time information of the previous entering operation, to obtain a time interval between the currently detected entering operation and the previous entering operation. In practical application, the user terminal may also calculate the time interval between the currently detected entering operation and the previous entering operation using another method, which is not limited herein.

503. The user terminal determines whether the time interval is less than a preset value, and if yes, performs step 504.

In this embodiment, after the user terminal calculates the time interval between the currently entering operation and the previous entering operation, the user terminal determines whether the time interval is less than the preset value, and if yes, performs step 504.

The preset value in this embodiment may be determined according to a factor such as an actual situation or a user operation habit. For example, the preset value may be 0.2 second, 0.5 second, or 1 second, which is not limited herein.

504. The user terminal determines a dialing numeral corresponding to the currently detected entering operation.

In this embodiment, when the user terminal determines that the time interval is less than the preset value, it indicates that a user expects to perform dialing on the standby screen, and the user terminal determines the dialing numeral corresponding to the currently detected entering operation.

505. The user terminal generates a dialing number according to the dialing numeral.

After determining the dialing numeral corresponding to the currently detected entering operation, the user terminal can generate the dialing number according to the dialing numeral.

It should be noted that the dialing number is a numeral string including at least one dialing numeral, and that the user terminal generates a dialing number according to the dialing numeral may be specifically saving, by the user terminal, the dialing numeral and using a numeral string formed after the saving as the dialing number. In practical application, to improve user experience, the user is allowed to delete a dialing numeral corresponding to the previous entering operation, and when the user terminal determines that the dialing numeral is a preset numeral, for example, when the preset numeral is "10" or "11" and the user enters "10" or "11", the user terminal may delete the dialing numeral corresponding to the previous entering operation and use a numeral string formed by remaining dialing numerals as the dialing number. It may be understood that the user terminal may further generate the dialing number according to the dialing numeral in another manner. For example, if one-touch easy dialing is set for the dialing numeral, a one-touch easy dialing number corresponding to the dialing numeral is used as the dialing number, which is not limited herein.

506. The user terminal determines whether the dialing number is a valid number, and if yes, performs step 507.

In this embodiment, after the user terminal generates the dialing number according to the dialing numeral, the user terminal can determine whether the dialing number is a valid number, and if yes, performs step 507.

It should be noted that a manner in which the user terminal determines that whether the dialing number is a valid number may be determining, by the user terminal, whether the dialing number matches a preset number, and if yes, determining that the dialing number is a valid number, or if no, determining that the dialing number is not a valid number, or determining whether a digit quantity of the dialing number is a valid digit quantity, and if yes, determining the dialing number is a valid number, or if no, determining the dialing number is not a valid number. In practical application, the user terminal may determine, in another manner, whether the dialing number is a valid number, which is not limited herein.

It may be understood that, in practical application, the user terminal may access a local network using a global positioning system GPS or Wi-Fi, to update local preset-number information, a digit quantity of the valid number, and the like, or may manually set information about the valid number, or may determine information about the valid number in another manner, which is not limited herein.

507. The user terminal displays a dialing icon.

In this embodiment, when the user terminal determines that the dialing number is a valid number, the user terminal displays the dialing icon on the standby screen.

508. The user terminal performs a call using the dialing number as a called number.

In this embodiment, when the user terminal detects an entering operation performed on the dialing icon, the user terminal performs the call using the dialing number as the called number.

It should be noted that, in this embodiment, the user terminal may display the dialing number in a preset area of the standby screen, or in practical application, the user terminal may not display the dialing number, which is not limited herein.

In this embodiment, a clock dial is displayed on a standby screen of a user terminal, and a moment indication numeral is displayed on the clock dial. When performing dialing using the user terminal, a user may enter a dialing numeral by means of an entering operation performed on the moment indication numeral. As shown in FIG. 2, the user terminal generates a dialing number according to the dialing numeral, and performs a call using the dialing number as a called number, that is, the user may conveniently implement a dialing operation on the standby screen of the user terminal, and can implement the dialing operation without a need to use screens of multiple levels. Therefore, a procedure in which the user performs the dialing operation using the user terminal is simplified, and efficiency of performing, by the user, the dialing operation using the user terminal is improved.

Secondly, this embodiment provides a manner of implementing a dialing operation using a standby screen. That is, each time the user terminal detects an entering operation, a time interval between the currently detected entering operation and a previous entering operation is calculated. When the time interval is less than a preset value, it indicates that a user expects to perform dialing on the standby screen, and the user terminal determines a dialing numeral corresponding to the currently detected entering operation. Otherwise, it may be considered that a user performs a misoperation, thereby avoiding a misoperation of the user in practical application and improving user experience.

Thirdly, in this embodiment, when determining that the dialing number is a valid number, the user terminal displays a dialing icon, and when detecting an entering operation performed on the dialing icon, the user terminal performs a call using the dialing number as a called number. Therefore, the misoperation in the practical application is further avoided.

Figure 6:
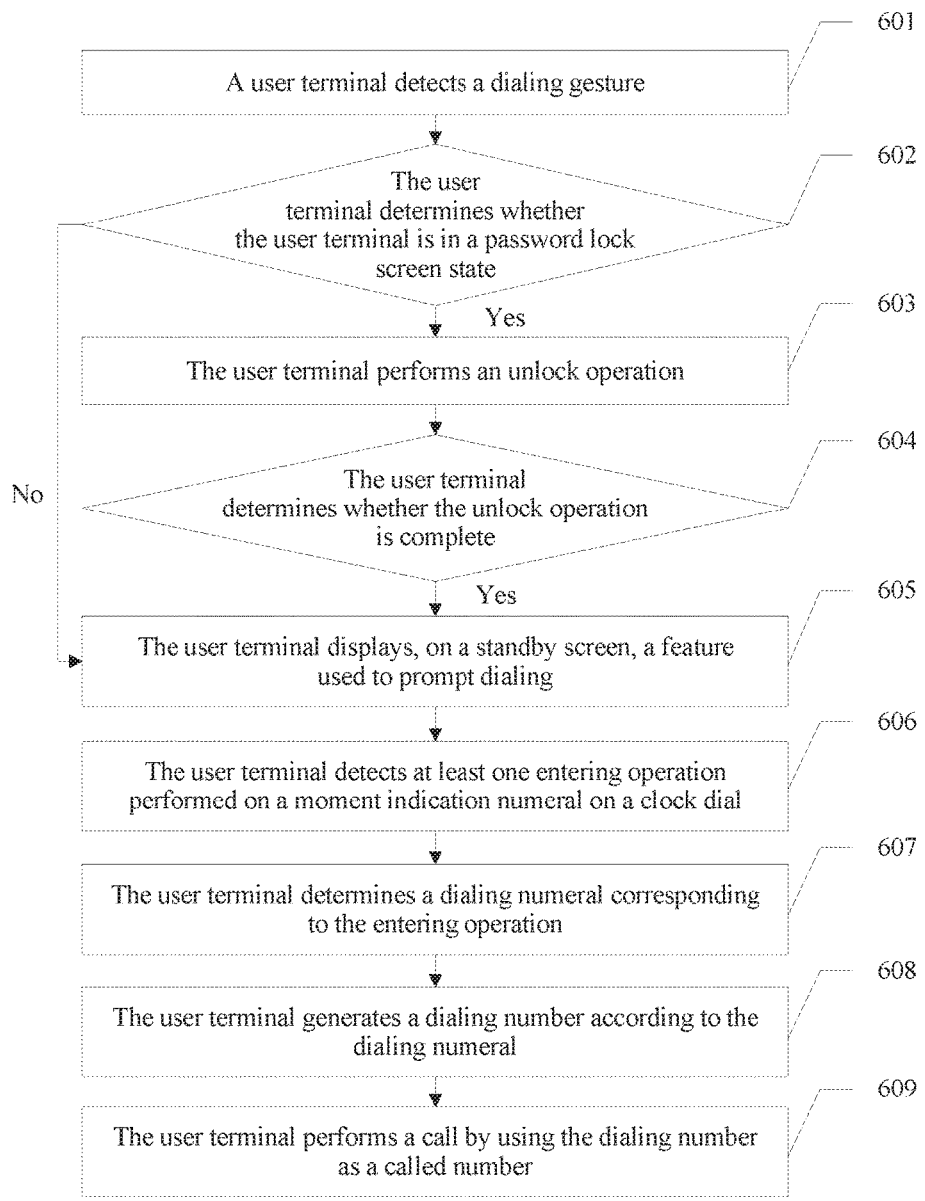
FIG. 6 is a flowchart of a dialing method for a user terminal according to another embodiment of the present disclosure.

Referring to FIG. 6, a dialing method for a user terminal according to another embodiment of the present disclosure includes the following steps.

601. A user terminal detects a dialing gesture.

In this embodiment, the user terminal can detect the dialing gesture, and the dialing gesture may be set by a user according to a factor such as a user operation habit, which is not limited herein.

602. The user terminal determines whether the user terminal is in a password lock screen state, and if yes, performs step 603, or if no, performs step 605.

In this embodiment, after the user terminal detects the dialing gesture, the user terminal determines whether the user terminal is in a password lock screen state, and if yes, performs step 603, or if no, performs step 605.

603. The user terminal performs an unlock operation, and performs step 604.

In this embodiment, if the user terminal is in a password lock screen state, the user terminal performs the unlock operation and performs step 604.

604. The user terminal determines whether the unlock operation is complete, and if yes, performs step 605.

In this embodiment, after performing the unlock operation, the user terminal can determine whether the unlock operation is complete, and if yes, performs step 605.

It should be noted that, in practical application, after the user terminal performs the unlock operation, there may be two cases: The unlock operation is complete or the unlock operation fails. If an unlock number entered by the user is a correct unlock code, the unlock operation is complete, and in this case, the password lock screen state of the user terminal is unlocked, that is, a substantial operation such as editing a file or running an application may be performed on the user terminal. If an unlock number entered by the user is not a correct unlock code, the unlock operation fails, and the user terminal remains in the password lock screen state.

605. The user terminal displays, on the standby screen, a feature used to prompt dialing.

In this embodiment, when the user terminal determines that the user terminal is not in a password lock screen state, or after the unlock operation is complete, the user terminal displays, on the standby screen, the feature used to prompt dialing, and performs step 607.

It should be noted that the feature used to prompt dialing described herein refers to a feature displayed on the standby screen and used to prompt the user to perform a dialing operation, and the feature used to prompt dialing may be specifically numeral flashing on the clock dial, numeral icon expansion, or dialing icon appearing on the standby screen, or may be another feature, which is not limited herein.

606. The user terminal detects at least one entering operation performed on a moment indication numeral on a clock dial.

In this embodiment, after displaying, on the standby screen, the feature used to prompt dialing, the user terminal can detect the at least one entering operation performed on the moment indication numeral on the clock dial, and the clock dial is displayed on the standby screen of the user terminal.

In practical application, the moment indication numeral on the clock dial displayed on the standby screen of the user terminal generally includes numeral elements "0" to "11".

607. The user terminal determines a dialing numeral corresponding to the entering operation.

In this embodiment, after the user terminal detects the at least one entering operation performed on the moment indication numeral on the standby screen, the user terminal can determine the dialing numeral corresponding to the entering operation.

608. The user terminal generates a dialing number according to the dialing numeral.

After determining the dialing numeral corresponding to the entering operation, the user terminal can generate the dialing number according to the dialing numeral.

It should be noted that the dialing number is a numeral string including at least one dialing numeral, and that the user terminal generates a dialing number according to the dialing numeral may be specifically saving, by the user terminal, the dialing numeral and using a numeral string formed after the saving as the dialing number. In practical application, to improve user experience, the user is allowed to delete a dialing numeral corresponding to a previous entering operation, and when the user terminal determines that the dialing numeral is a preset numeral, for example, when the preset numeral is "10" or "11" and the user enters "10" or "11", the user terminal may delete the dialing numeral corresponding to the previous entering operation and use a numeral string formed by remaining dialing numerals as the dialing number. It may be understood that the user terminal may further generate the dialing number according to the dialing numeral in another manner. For example, if one-touch easy dialing is set for the dialing numeral, a one-touch easy dialing number corresponding to the dialing numeral is used as the dialing number, which is not limited herein.

609. The user terminal performs a call using the dialing number as a called number.

After generating the dialing number according to the dialing numeral, the user terminal can perform the call using the dialing number as the called number.

In practical application, that the user terminal performs a call using the dialing number as a called number may be specifically directly calling the dialing number when the user completes entering, or calling the dialing number when the user taps a dialing icon, which is not limited herein.

It should be noted that, in this embodiment, the user terminal may display the dialing number in a preset area of the standby screen, or in practical application, the user terminal may not display a target number, which is not limited herein.

In this embodiment, a clock dial is displayed on a standby screen of a user terminal, and a moment indication numeral is displayed on the clock dial. When performing dialing using the user terminal, a user may enter a dialing numeral by means of an entering operation performed on the moment indication numeral. As shown in FIG. 2, the user terminal generates a dialing number according to the dialing numeral, and performs a call using the dialing number as a called number, that is, the user may conveniently implement a dialing operation on the standby screen of the user terminal, and can implement the dialing operation without a need to use screens of multiple levels. Therefore, a procedure in which the user performs the dialing operation using the user terminal is simplified, and efficiency of performing, by the user, the dialing operation using the user terminal is improved.

Secondly, in this embodiment, when detecting a dialing gesture, the user terminal may display, on the standby screen, a feature used to prompt dialing, to prompt the user to perform the dialing operation, thereby improving user experience.

Figure 7:
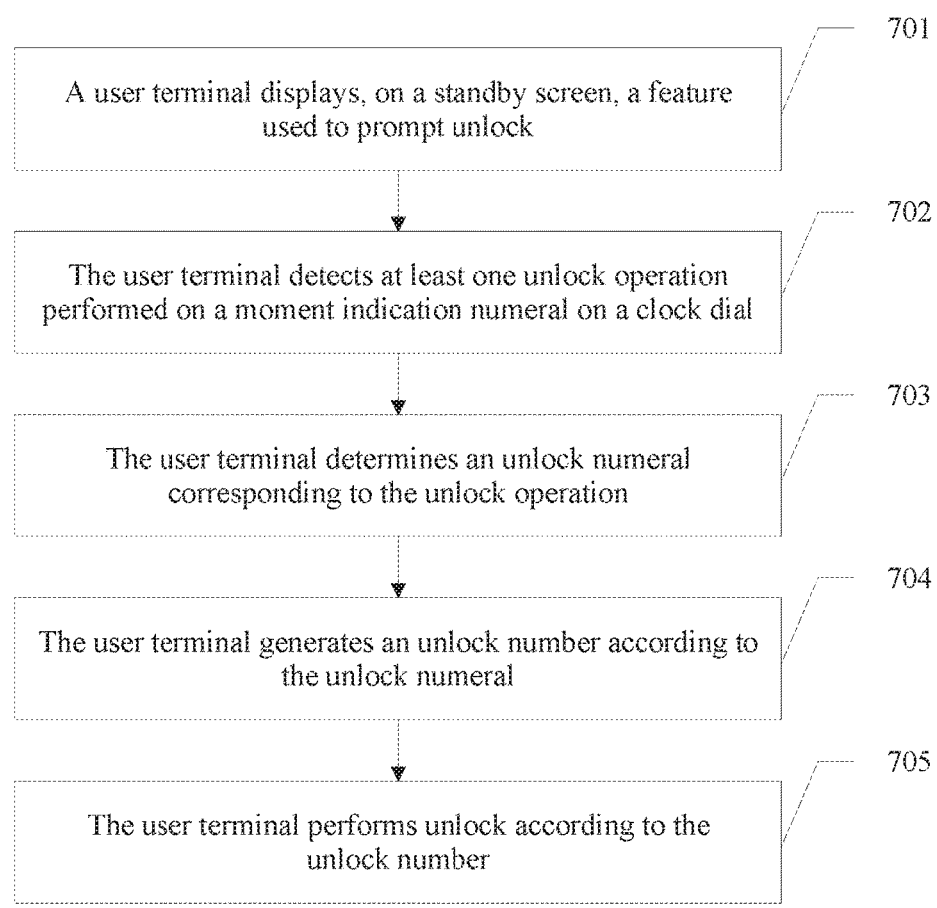
FIG. 7 is a flowchart of a dialing method for a user terminal according to another embodiment of the present disclosure.

It may be understood that, in practical application, an unlock operation performed by the user terminal may also be implemented on the standby screen. Specifically Referring to FIG. 7, an unlock operation method for a user terminal according to another embodiment of the present disclosure includes the following steps.

701. A user terminal displays, on the standby screen, a feature used to prompt unlock.

In this embodiment, when the user terminal performs an unlock operation, the user terminal displays, on the standby screen, the feature used to prompt unlock.

It should be noted that the feature used to prompt unlock described herein refers to a feature displayed on the standby screen and used to prompt a user to perform the unlock operation, and the feature used to prompt unlock may be specifically numeral flashing on the clock dial, numeral icon expansion, or unlock icon appearing on the standby screen, or may be another feature, which is not limited herein.

702. The user terminal detects at least one unlock operation performed on a moment indication numeral on a clock dial.

In this embodiment, after the user terminal displays, on the standby screen, the feature used to prompt unlock, the user terminal can detect the at least one unlock operation performed on the moment indication numeral on the clock dial, and the clock dial is displayed on the standby screen of the user terminal.

The unlock operation performed on the moment indication numeral on the standby screen is completed by the user, and may be that the user taps or slides the moment indication numeral, or may be another unlock operation, which is not limited herein.

In practical application, the moment indication numeral on the clock dial displayed on the standby screen of the user terminal generally includes numeral elements "0" to "11".

703. The user terminal determines an unlock numeral corresponding to the unlock operation.

After the user terminal detects the at least one unlock operation performed on the moment indication numeral on the clock dial, the user terminal can determine the unlock numeral corresponding to the unlock operation.

704. The user terminal generates an unlock number according to the unlock numeral.

After determining the unlock numeral corresponding to the entering operation, the user terminal can generate the unlock number according to the unlock numeral.

It should be noted that the unlock number is a numeral string including at least one unlock numeral, and that the user terminal generates an unlock number according to the unlock numeral may be specifically saving, by the user terminal, the unlock numeral and using a numeral string formed after the saving as the unlock number. In practical application, to improve user experience, the user is allowed to delete an unlock numeral corresponding to a previous entering operation, and when the user terminal determines that the unlock numeral is a preset numeral, for example, when the preset numeral is "10" or "11" and the user enters "10" or "11", the user terminal may delete the dialing numeral corresponding to the previous entering operation and use a numeral string formed by remaining dialing numerals as the dialing number. It may be understood that the user terminal may further generate the dialing number according to the dialing numeral in another manner. For example, an unlock numeral is touched and held to directly generate an unlock number, which is not limited herein.

705. The user terminal performs unlock according to the unlock number.

After the user terminal generates the unlock number according to the unlock numeral, the user terminal can perform unlock according to the unlock number.

That the user terminal performs unlock according to the unlock number may be specifically if the unlock number is a correct unlock code, the unlock operation is complete, and in this case, the password lock screen state of the user terminal is unlocked, that is, a substantial operation such as editing a file or running an application may be performed on the user terminal, if the unlock number is not a correct unlock code, the unlock operation fails, and the user terminal remains in the password lock screen state.

In this embodiment, a clock dial is displayed on a standby screen of a user terminal, and a moment indication numeral is displayed on the clock dial. When performing unlock using the user terminal, a user may enter an unlock numeral by means of an unlock operation performed on the moment indication numeral. The user terminal generates an unlock number according to the unlock numeral, and performs unlock according to the unlock number, that is, the user may conveniently unlock the standby screen of the user terminal, and can implement unlock without a need to use screens of multiple levels. Therefore, a procedure in which the user unlocks the user terminal is simplified, and efficiency of unlocking the user terminal by the user is improved.

For ease of understanding, a dialing method for a user terminal according to an embodiment of the present disclosure is described using a specific application scenario. A smart watch is used as an example. Specifically Referring to FIG. 8, a clock dial is displayed on a standby screen of the smart watch, and moment indication numerals used to indicate moment information are displayed on the clock dial, that is, "0" to "11" in FIG. 8.

Figure 8:
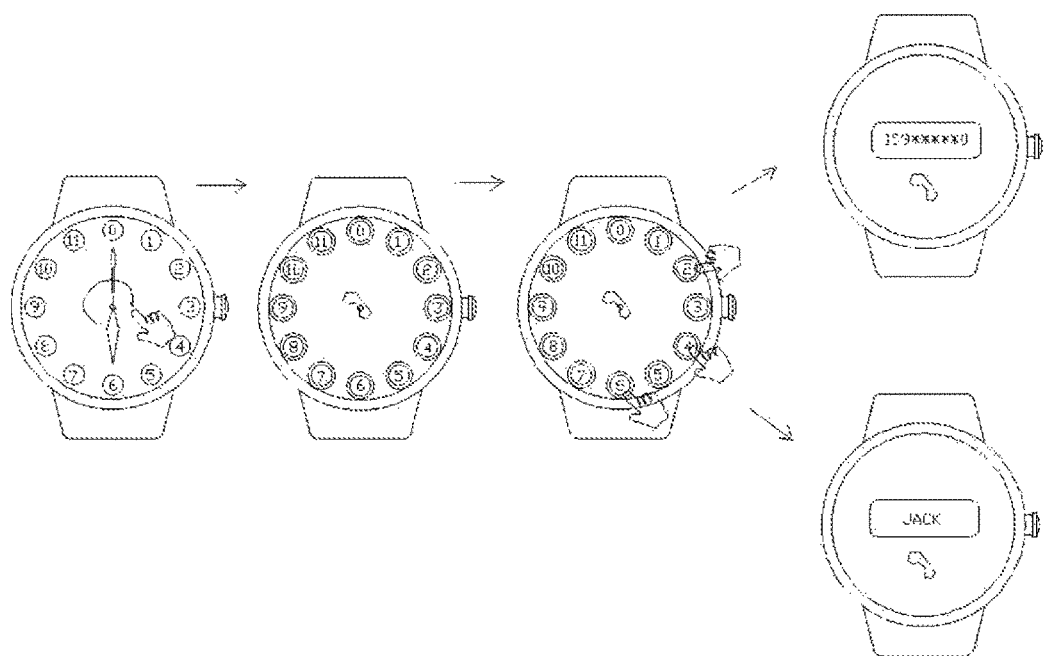
FIG. 8 is a schematic operational diagram of a dialing method for a user terminal according to the present disclosure.

When a user needs to perform a dialing operation using the smart watch, the user enters a dialing gesture on the standby screen, as shown in the first picture on the left side of FIG. 8. After the smart watch detects the dialing gesture, a feature used to prompt dialing is displayed on the standby screen, that is, a phone icon in the second picture on the left side in FIG. 8.

The smart watch detects an entering operation performed on the moment indication numeral on the clock dial, as shown in the third picture on the left side of FIG. 8, determines a dialing numeral corresponding to the entering operation, saves the dialing numeral, and uses a numeral string formed after the saving as a dialing number, for example, "15988778811". In this process, if the smart watch detects the entering operation performed on the moment indication numeral on the clock dial, and determines that a numeral corresponding to the entering operation is "10" or "11", a dialing numeral corresponding to a previous entering operation may be deleted. For example, after the user enters "15988776", the user may delete the dialing numeral "6" by touching "10" or "11".

After the entering operation of the user is complete, the smart watch may perform a call using the dialing number as a called number, or may perform a call when detecting an entering operation performed on a dialing icon, as shown in the fourth picture in FIG. 8.

Figure 9:
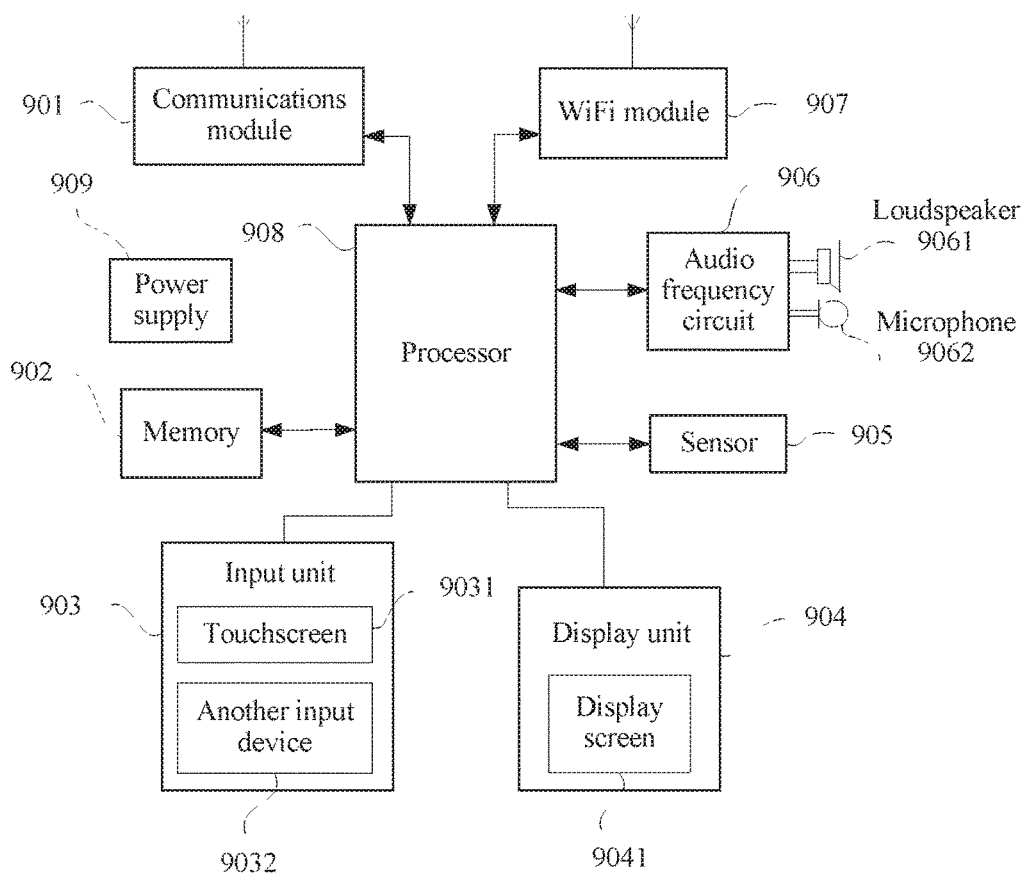
FIG. 9 is a schematic structural diagram of a user terminal according to an embodiment of the present disclosure.

An embodiment of the present disclosure further provides a user terminal, as shown in FIG. 9. For ease of description, only a part related to this embodiment of the present disclosure is shown. For specific technical details that are not disclosed, refer to a method part in the embodiments of the present disclosure. The user terminal may be any terminal device, including a mobile phone, a smart watch, a tablet computer, a Personal Digital Assistant (PDA), a Point of Sales (POS), a vehicle-mounted computer, or the like.

FIG. 9 shows a block diagram of a partial structure related to a user terminal according to an embodiment of the present disclosure. Referring to FIG. 9, the user terminal includes parts such as a communications module 901, a memory 902, an input unit 903, a display unit 904, a sensor 905, an audio frequency circuit 906, a Wireless Fidelity (WiFi) module 907, a processor 908, and a power supply 909. Persons skilled in the art may understand that the structure of the user terminal shown in FIG. 9 does not constitute a limitation on the user terminal. The user terminal may include parts more or less than those shown in FIG. 10, a combination of some parts, or parts arranged differently.

The following describes each compositional part of the user terminal in detail with reference to FIG. 9.

The communications module 901 may be configured to receive and send a signal in an information receiving or sending process or a call process. Particularly, after receiving downlink information of a base station, the communications module 901 sends the downlink information to the processor 908 for processing, and in addition, sends related uplink data to the base station. Generally, the communications module 901 includes a radio frequency (RF) circuit, and includes but is not limited to an antenna, at least one amplifier, a transceiver, a coupler, a low noise amplifier (LNA), a duplexer, and the like. In addition, the communications unit 901 may further communicate with a network and another device by means of wireless communications. The wireless communications may use any communications standard or protocol, which includes but is not limited to a Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), and the like.

The memory 902 may be configured to store a software program and a module, and the processor 902 runs the software program and the module that are stored in the memory 902, to execute various functional applications and perform data processing. The memory 902 may mainly include a program storage area and a data storage area, where the program storage area may store an operating system, an application program that is required by at least one function (such as a sound playing function or an image playing function), and the like, and the data storage area may store data (such as audio data or a phonebook) that is created according to use of the user terminal, and the like. In addition, the memory 902 may include a high-speed random access memory, and may further include a nonvolatile memory such as at least one magnetic disk storage component, a flash memory component, or another volatile solid-state storage component.

The input unit 903 may be configured to receive input numeral or character information, and generate key signal input related to user setting and functional control of the user terminal. Specifically, the input unit 903 may include a touchscreen 9031 and another input device 9032. The touchscreen 9031 is also referred to as a touch panel and may collect an input operation (such as an operation performed on the touchscreen 9031 or near the touchscreen 9031 by a user using any proper object or accessory such as a finger or a stylus) performed on or near the touchscreen by a user, and drive a corresponding connection apparatus according to a preset program. Optionally, the touchscreen 9031 may include two parts a touch detection apparatus and a touch controller. The touch detection apparatus detects a touch position of the user, detects a signal brought by an input operation, and transfers the signal to the touch controller. The touch controller receives touch information from the touch detection apparatus, converts the touch information into coordinates of a touch point, then sends the coordinates of the touch point to the processor 908, and can receive and execute a command sent by the processor 908. In addition, the touchscreen 9031 may be implemented using multiple types such as a resistive type, a capacitive type, an infrared, and a surface acoustic wave. The input unit 903 may include another input device 9032 in addition to the touchscreen 9031. Specifically, the another input device 9032 may include but is not limited to one or more of a function key (for example, a volume control key or an on/off key), a trackball, a mouse, an operating lever, or the like.

The display unit 904 may be configured to display information input by a user or information provided for a user, and various menus of the user terminal. The display unit 904 may include a display screen 9041. Optionally, the display screen 9041 may be configured in a form of a liquid crystal display (LCD), an organic light-emitting diode (OLED), or the like. Further, the touchscreen 9031 may cover the display screen 9041. After detecting the input operation on or near the touchscreen 9031, the touchscreen 9031 transmits the touch operation to the processor 908 to determine a type of a touch event, and then the processor 908 provides corresponding visual output on the display screen 9041 according to the type of the touch event. In FIG. 9, the touchscreen 9031 and the display screen 9041 are used as two independent parts to implement input and output functions of the user terminal. However, in some embodiments, the touchscreen 9031 and the display screen 9041 may be integrated to implement the input and output functions of the user terminal.

The user terminal may further include at least one type of sensor 905, such as a light sensor, a motion sensor, or another sensor. Specifically, the light sensor may include an ambient light sensor and a proximity sensor. The ambient light sensor may adjust luminance of the display screen 9041 according to brightness of ambient light, and the proximity sensor may turn off the display screen 9041 and/or backlight when the user terminal approaches an ear. As a type of the motion sensor, an acceleration sensor can detect an acceleration value in each direction (generally, three axes), and detect a value and a direction of gravity when the acceleration sensor is static, and can be used in an application for recognizing a posture (such as screen switching between landscape and portrait modes, a related game, or magnetometer posture calibration) of the user terminal, a function related to vibration recognition (such as a pedometer or a knock), and the like. For other sensors such as a gyroscope, a hygrometer, a barometer, a thermometer, and an infrared sensor that may also be disposed on the user terminal, details are not described herein.

The audio frequency circuit 906, a loudspeaker 9061, and a microphone 9062 may provide an audio interface between the user and the user terminal. The audio circuit 906 may transmit, to the loudspeaker 9061, an electrical signal converted from received audio data, and the loudspeaker 9061 converts the electrical signal into a sound signal for output. On the other hand, the microphone 9062 converts a collected sound signal into an electrical signal, the audio circuit 9060 converts the electrical signal into audio data upon receiving the electrical signal and outputs the audio data to the processor 908 for processing, and then the audio data is sent to, for example, another user terminal, using the communications module 901, or outputs the audio data to the memory 902 for further processing.

WiFi belongs to a short-distance wireless transmission technology. The user terminal may help, using the WiFi module 907, the user receive and send an email, browse a web page, access a streaming media, and the like. The WiFi module 907 provides wireless broadband Internet access for the user. Although FIG. 9 shows the WiFi module 907, it may be understood that the WiFi module 907 is not a mandatory composition of the user terminal, and may be totally omitted according to a requirement without changing the essential scope of the present disclosure.

The processor 908 is a control center of the user terminal, and is connected to all the parts of the entire user terminal using various interfaces and lines, and perform various functions of the user terminal and data processing by running or executing the software program and/or the module that are/is stored in the memory 902 and by invoking data stored in the memory 902 to perform overall monitoring on the user terminal. Optionally, the processor 908 may include one or more processing units. Preferably, an application processor and a modem processor may be integrated into the processor 908. The application processor mainly processes an operating system, a user interface, an application program, and the like. The modem processor mainly processes radio communications. It may be understood that the foregoing modem processor may not be integrated into the processor 908.

The user terminal further includes the power supply 909 (such as a battery) that supplies power to all the parts. Preferably, the power supply may be logically connected to the processor 908 using a power management system such that functions such as charging and discharging management and power consumption management are implemented using the power management system.

Although not shown, the user terminal may further include a camera, a Bluetooth module, and the like, which are not described herein.

In this embodiment of the present disclosure, the display screen 9041 included in the user terminal further has the following function displaying a standby screen, where a clock dial is displayed on the standby screen.

The touchscreen 9031 is further configured to detect at least one entering operation performed on a moment indication numeral on the clock dial displayed on the display screen 9041.

The processor 908 is further configured to determine a dialing numeral corresponding to the entering operation detected by the touchscreen 9031, and generate a dialing number according to the dialing numeral.

The communications module 901 is further configured to perform a call using the dialing number generated by the processor 908 as a called number.

Optionally, the processor 908 is further configured to calculate, each time the touchscreen 9031 detects an entering operation, a time interval between the entering operation currently detected by the touchscreen 9031 and a previous entering operation, and determine whether the time interval is less than a preset value, and if yes, determine a dialing numeral corresponding to the entering operation detected currently by the touchscreen 9031.

Optionally, after the processor 908 generates the dialing number according to the dialing numeral, and before the communications module 901 performs the call using the dialing number generated by the processor 908 as the called number, the processor 908 is further configured to determine whether the dialing number is a valid number, the display screen 9041 is further configured to display a dialing icon when the processor 908 determines that the dialing number is a valid number, and the communications module 901 is further configured to perform, when the touchscreen 9031 detects an entering operation performed on the dialing icon, the call using the dialing number as the called number.

Optionally, the touchscreen 9031 is further configured to detect a dialing gesture, the processor 908 is further configured to determine, when the touchscreen 9031 detects the dialing gesture, whether the user terminal is in a password lock screen state, and if yes, perform an unlock operation, and the display screen 9041 is further configured to display, on the standby screen after the unlock operation of the processor 908 is completed, a feature used to prompt dialing, or if yes, display, on the standby screen, the feature used to prompt dialing.

Optionally, the display screen 9041 is further configured to display, on the standby screen when the user terminal performs the unlock operation, a feature used to prompt unlock, the touchscreen 9031 is further configured to detect, on the standby screen after the display screen 9041 displays the feature used to prompt unlock, at least one unlock operation performed on the moment indication numeral on the clock dial, and the processor 908 is further configured to determine, when the touchscreen 9031 detects the at least one unlock operation performed on the moment indication numeral on the clock dial, an unlock numeral corresponding to the unlock operation, and generate an unlock number according to the unlock numeral, and perform unlock according to the unlock number.

Optionally, the display screen 9041 is further configured to display the dialing number in a preset area of the standby screen.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A dialing method for a user terminal, the method comprising:
   detecting, by a user terminal, at least one entering operation performed on a moment indication numeral on a clock dial displayed on a standby screen of the user terminal;
   determining, by the user terminal, a dialing number according to the at least one entering operation at least in part by:
      calculating, by the user terminal, a time interval between a currently detected entering operation and a previous entering operation each time the user terminal detects the at least one entering operation; and
      determining, by the user terminal when the time interval is less than a preset value, a number corresponding to the currently detected entering operation as the dialing number; and
   performing, by the user terminal, a call using the dialing number as a called number.

2. The dialing method of claim 1, wherein after determining, by the user terminal, the dialing number according to the at least one entering operation and before performing, by the user terminal, the call using the dialing number as the called number, the method further comprises displaying, by the user terminal, a dialing icon on the standby screen when the dialing number is a valid number, and performing, by the user terminal, the call using the dialing number as the called number comprises performing, by the user terminal, the call using the dialing number as the called number when the user terminal detects the at least one entering operation performed on the dialing icon.

3. The dialing method of claim 2, wherein determining, by the user terminal, whether the dialing number is the valid number comprises determining, by the user terminal, that the dialing number is the valid number when the dialing number matches a preset number.

4. The dialing method of claim 2, wherein determining, by the user terminal, whether the dialing number is the valid number comprises determining, by the user terminal, that the dialing number is the valid number when a digit quantity of the dialing number is a valid digit quantity.

5. The dialing method of claim 1, wherein before detecting, by the user terminal, the at least one entering operation performed on the moment indication numeral on the clock dial, the method further comprises:
   determining, by the user terminal, whether the user terminal is in a password lock screen state when the user terminal detects a dialing gesture;
   performing, by the user terminal, an unlock operation when the user terminal is in the password lock screen state; and
   displaying, by the user terminal on the standby screen, a feature used to prompt dialing after the unlock operation is complete.

6. The dialing method of claim 5, wherein performing, by the user terminal, the unlock operation comprises:
   displaying, by the user terminal on the standby screen, a feature used to prompt unlock;
   detecting, by the user terminal, at least one unlock operation performed on the moment indication numeral on the clock dial;
   determining, by the user terminal, an unlock number according to the at least one entering operation performed on the moment indication numeral on the clock dial; and
   performing, by the user terminal, the unlock operation according to the unlock number.

7. The dialing method of claim 5, wherein the method further comprises displaying, by the user terminal, the dialing number in a preset area of the standby screen.

8. The dialing method of claim 1, wherein before detecting, by the user terminal, the at least one entering operation performed on the moment indication numeral on the clock dial, the method further comprises:
   determining, by the user terminal, whether the user terminal is in a password lock screen state when the user terminal detects a dialing gesture; and
   displaying, by the user terminal on the standby screen, a feature used to prompt dialing when the user terminal is not in the password lock screen state.

9. The dialing method of claim 8, wherein the method further comprises displaying, by the user terminal, the dialing number in a preset area of the standby screen.

10. The dialing method of claim 1, wherein the method further comprises displaying, by the user terminal, the dialing number in a preset area of the standby screen.

11. A user terminal, comprising:
    a touchscreen configured to:

display a standby screen that includes a clock dial; and
detect at least one entering operation performed on a moment indication numeral on the clock dial displayed on the standby screen; and
a processor coupled to the touchscreen and configured to:
determine a dialing number according to the at least one entering operation detected by the touchscreen at least in part by:
calculating a time interval between a currently detected entering operation and a previous entering operation each time the touchscreen detects the at least one entering operation; and
determining a number corresponding to the currently detected entering operation as the dialing number when the time interval is less than a preset value; and
perform a call using the dialing number as a called number.

12. The user terminal of claim 11, wherein after the processor determines the dialing number and before the processor performs the call using the dialing number as the called number, the processor is further configured to determine whether the dialing number is a valid number, the touchscreen is further configured to display a dialing icon when the processor determines that the dialing number is the valid number, and the processor is further configured to perform the call using the dialing number as the called number when the touchscreen detects the at least one entering operation performed on the dialing icon.

13. The user terminal of claim 11, wherein after the processor determines the dialing number and before the processor performs the call using the dialing number as the called number, the processor is further configured to determine whether the dialing number is a valid number, the touchscreen is further configured to display a dialing icon when the processor determines that the dialing number is the valid number, and the processor is further configured to perform the call using the dialing number as the called number when the touchscreen detects the at least one entering operation performed on the dialing icon.

14. The user terminal of claim 11, wherein the touchscreen is further configured to detect a dialing gesture, and the processor is further configured to:

determine whether the user terminal is in a password lock screen state when the touchscreen detects the dialing gesture; and
perform an unlock operation when the user terminal is in the password lock screen state, and
wherein the standby screen is further configured to display a feature used to prompt dialing on the standby screen after the unlock operation is complete.

15. The user terminal of claim 14, wherein the touchscreen is further configured to:
display a feature used to prompt unlock on the standby screen; and
detect at least one unlock operation performed on the moment indication numeral on the clock dial on the standby screen after the standby screen displays the feature used to prompt unlock, and
wherein the processor is further configured to:
determine an unlock number when the touchscreen detects the at least one entering operation performed on the moment indication numeral on the clock dial; and
perform the unlock operation according to the unlock number.

16. The user terminal according to claim 15, wherein the touchscreen is further configured to display the dialing number in a preset area of the standby screen.

17. The user terminal of claim 11, wherein the touchscreen is further configured to detect a dialing gesture, and wherein the processor is further configured to:
determine whether the user terminal is in a password lock screen state when the touchscreen detects the dialing gesture; and
perform an unlock operation when the user terminal is in the password lock screen state, and
wherein the standby screen is further configured to display a feature used to prompt dialing on the standby screen when the user terminal is not in the password lock screen state.

18. The user terminal of claim 11, wherein the standby screen is further configured to display the dialing number in a preset area of the standby screen.

* * * * *